(12) United States Patent
Ashar et al.

(10) Patent No.: US 9,292,299 B2
(45) Date of Patent: Mar. 22, 2016

(54) METHODS AND SYSTEMS FOR PACKAGE MANAGEMENT

(71) Applicant: Yahoo! Inc., Sunnyvale, CA (US)

(72) Inventors: Karan Ashar, Sunnyvale, CA (US); Daryl Low, San Jose, CA (US); Anne-Lise Hassenklover, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 130 days.

(21) Appl. No.: 13/653,180

(22) Filed: Oct. 16, 2012

(65) Prior Publication Data

US 2014/0109077 A1  Apr. 17, 2014

(51) Int. Cl.
*G06F 9/44* (2006.01)
*G06F 9/445* (2006.01)
*G06F 9/45* (2006.01)

(52) U.S. Cl.
CPC .. *G06F 9/44* (2013.01); *G06F 8/70* (2013.01); *G06F 8/433* (2013.01); *G06F 8/61* (2013.01)

(58) Field of Classification Search
CPC .............. G06F 8/61; G06F 8/67; G06F 8/65; G06F 8/71; G06F 8/70; G06F 9/44; G06F 8/433
See application file for complete search history.

(56) References Cited

U.S. PATENT DOCUMENTS

| | | | | |
|---|---|---|---|---|
| 6,117,187 A * | 9/2000 | Staelin | ...................... | G06F 8/61 717/169 |
| 8,347,279 B2 * | 1/2013 | Chin | ......................... | G06F 8/65 717/168 |
| 8,635,609 B2 * | 1/2014 | Deblaquiere | ............. | G06F 8/65 717/173 |
| 2002/0129346 A1 * | 9/2002 | Lee | ........................... | G06F 8/20 717/163 |
| 2004/0255291 A1 * | 12/2004 | Sierer et al. | ................... | 717/174 |
| 2006/0031827 A1 * | 2/2006 | Barfield | ................... | G06F 8/65 717/168 |
| 2006/0168577 A1 * | 7/2006 | Melo | ......................... | G06F 8/71 717/168 |
| 2006/0184927 A1 * | 8/2006 | Deblaquiere | ............. | G06F 8/65 717/168 |
| 2008/0028395 A1 * | 1/2008 | Motta et al. | .................... | 717/177 |
| 2009/0100421 A1 * | 4/2009 | Flaming et al. | ............... | 717/174 |
| 2009/0265699 A1 * | 10/2009 | Toeroe | ...................... | G06F 8/65 717/168 |
| 2010/0251232 A1 * | 9/2010 | Shinomiya | ..................... | 717/177 |
| 2011/0030062 A1 * | 2/2011 | Hsu et al. | ......................... | 726/26 |
| 2011/0067023 A1 * | 3/2011 | Chiyo et al. | .................. | 717/177 |

(Continued)

OTHER PUBLICATIONS

Zhang Xu, dPAN: distributed package management network intership report, 2010, pp. 3-32.*

(Continued)

*Primary Examiner* — Thuy Dao
*Assistant Examiner* — Mongbao Nguyen
(74) *Attorney, Agent, or Firm* — Martine Penilla Group, LLP

(57) ABSTRACT

A server-implemented method for managing packages on a client device is provided. The method initiates with receiving a content request from a client device, the content request defining a requested content item and current package data identifying one or more currently installed packages on the client device. Required packages for providing the requested content item are determined based on the content request, wherein determining the required packages includes analyzing dependencies amongst the required packages. A response to the content request is generated based on the determined required packages and the current package data, the response defining actions for providing the requested content item at the client device and actions for managing the one or more currently installed packages on the client device. The package management instructions are sent to the client device.

15 Claims, 8 Drawing Sheets

(56) References Cited

U.S. PATENT DOCUMENTS

| | | | |
|---|---|---|---|
| 2011/0246993 A1* | 10/2011 | Moir et al. | 718/101 |
| 2011/0265072 A1* | 10/2011 | Matthew | G06F 8/65 717/169 |
| 2012/0060145 A1* | 3/2012 | Schloegel | G06F 8/451 717/107 |
| 2012/0166597 A1* | 6/2012 | Babey et al. | 709/220 |
| 2012/0216179 A1* | 8/2012 | Sharma | G06F 8/65 717/168 |
| 2013/0036415 A1* | 2/2013 | Birtwhistle | 717/173 |
| 2013/0042230 A1* | 2/2013 | Little | G06F 8/65 717/173 |

OTHER PUBLICATIONS

Alexander Keller, IBM Research Report, Dynamic Dependencies in Application Service Management, 2000, pp. 2-6.*

G. kar, Managing Application Services over Service Provider Networks: Architecture and Dependency Analysis, 2000, pp. 1-13.*

* cited by examiner

METHODS AND SYSTEMS FOR PACKAGE MANAGEMENT

BACKGROUND

1. Field of the Invention

The present invention relates to methods and systems for package management.

2. Description of the Related Art

In a typical internet website architecture, webpages of a website are hosted on a remotely situated web server that is accessible via a network. If a user loses network connectivity, then the user also loses the ability to access the webpages. This is a generally accepted norm for web browsing. However, in the case of an electronic publication, loss of connectivity resulting in loss of content delivery would present a poor user experience. For in keeping with the electronic publication as an analogue of a physical print publication, once properly downloaded, the entirety of the electronic publication should be made available to the user without continuing dependence on network connectivity.

The increasing popularity of mobile devices such as cellular phones and tablet computers has fueled the growth of standalone applications (often referred to as "apps") which are instantiated through an existing browser associated with the mobile device. To address the issue of network dependency, the HyperText Markup Language 5 (HTML5) standard supports a cache manifest which, lists files (e.g. html, css, jpegs, pngs, etc.) for the browser to download and cache locally, enabling an application to function in a standalone fashion. However, the HTML5 cache manifest requires one to list all possible required files, or else the application will not have all files cached which it potentially requires. Such an inflexible approach is not practical for an application which provides access to large quantities of data—e.g. an electronic publication application which provides access to electronic publications—as a manifest listing of all potentially required data files would result in lengthy downloads that may not be relevant for a given user and would degrade the user experience.

It is in this context that embodiments of the invention arise.

SUMMARY

Broadly speaking, embodiments of the present invention provide methods and systems for package management. Several inventive embodiments are described below.

In one embodiment, a server-implemented method for managing packages on a client device is provided. The method initiates with receiving a content request from a client device, the content request defining a requested content item and current package data identifying one or more currently installed packages on the client device. Required packages for providing the requested content item are determined based on the content request, wherein determining the required packages includes analyzing dependencies amongst the required packages. A response to the content request is generated based on the determined required packages and the current package data, the response defining actions for providing the requested content item at the client device and actions for managing the one or more currently installed packages on the client device. The package management instructions are sent to the client device.

In one embodiment, generating the response includes determining one or more of the required packages which are not currently installed on the client device; and the actions for providing the requested content item at the client device include actions for retrieving the one or more of the required packages, and their dependent packages, which are not currently installed on the client device.

In one embodiment, the actions for managing the one or more currently installed packages on the client device include one or more of a package update or a package deletion.

In one embodiment, generating the package management instructions includes defining one or more transaction groups based at least in part on the analyzed dependencies amongst the required packages, each of the transaction groups defining a set of one or more package transactions which are atomically committed at the client device.

In one embodiment, package transactions of any one of the transaction groups are not dependent on package transactions of any other of the transaction groups.

In one embodiment, analyzing dependencies amongst the required packages includes accessing a predefined dependency tree for a given required package.

In another embodiment, a tangible computer readable medium having program instructions embodied thereon is provided. The tangible computer readable medium includes: program instructions for receiving a content request from a client device, the content request defining a requested content item and current package data identifying one or more currently installed packages on the client device; program instructions for determining, based on the content request, required packages for providing the requested content item, wherein determining the required packages includes analyzing dependencies amongst the required packages; program instructions for generating, based on the determined required packages and the current package data, a response to the content request, the response defining actions for providing the requested content item at the client device and actions for managing the one or more currently installed packages on the client device; program instructions for sending the package management instructions to the client device.

In another embodiment, a system for managing packages on a client device is provided, comprising a package management server configured to receive a content request from a client device, the content request defining a requested content item and current package data identifying one or more currently installed packages on the client device. The package management server includes a registry for determining, based on the content request, required packages for providing the requested content item, the registry including a dependency analyzer for analyzing dependencies amongst the required packages. The package management server also includes a response generator for generating, based on the determined required packages and the current package data, a response to the content request, the response defining actions for providing the requested content item at the client device and actions for managing the one or more currently installed packages on the client device, the response generator configured to send the package management instructions to the client device.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe systems and methods for package management. It will be obvious, however, to one skilled in the art, that the present invention may be practiced without some or all of these specific details. In other instances, well known process operations have not been described in detail in order not to unnecessarily obscure the present invention.

In the present disclosure, reference will be made to electronic publications and applications for accessing electronic publications. These electronic items serve to illustrate the advantageous effects of the methods and systems for package management in accordance with embodiments of the present invention. However, it will be appreciated that the package management methods and systems described herein are equally applicable to other types of digital/electronic items which may benefit from such services, including other types of applications and content.

Figure 1:
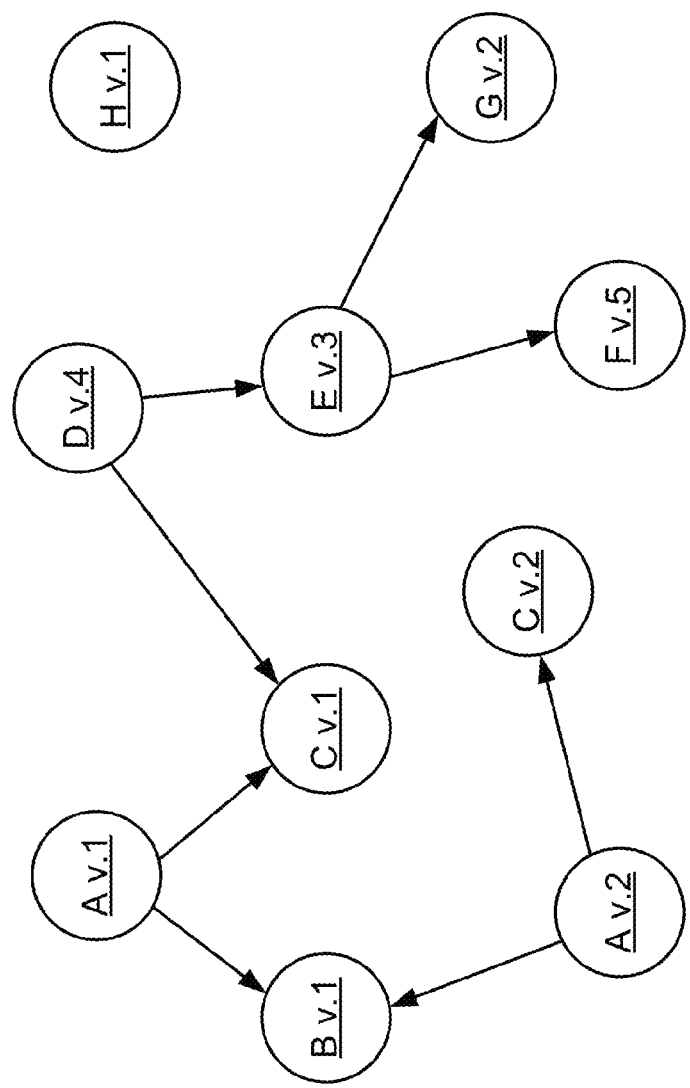
FIG. 1 conceptually illustrates a plurality of packages and their interdependencies, in accordance with embodiments of the invention.

FIG. 1 conceptually illustrates a plurality of packages and their interdependencies, in accordance with embodiments of the invention. As shown, the package A version 1 is dependent on two packages, namely the package B version 1 and the package C version 1. There is also a version 2 of the package A, which is also dependent on the package B version 1, but is different from package A version 1 in that package A version 2 is dependent upon package C version 2. It will be apparent that packages can share dependencies. For example, the package D version 4 shares its dependency on package C version 1 along with the package A version 1. Also, there can be multiple layers of dependencies for a given package. For example, the package D version 4 is dependent on package E version 3, which is in turn dependent upon package F version 5 and package G version 2. Some packages do not have common dependencies. For example, the package H version 1 is not dependent upon any other packages.

Figure 2:
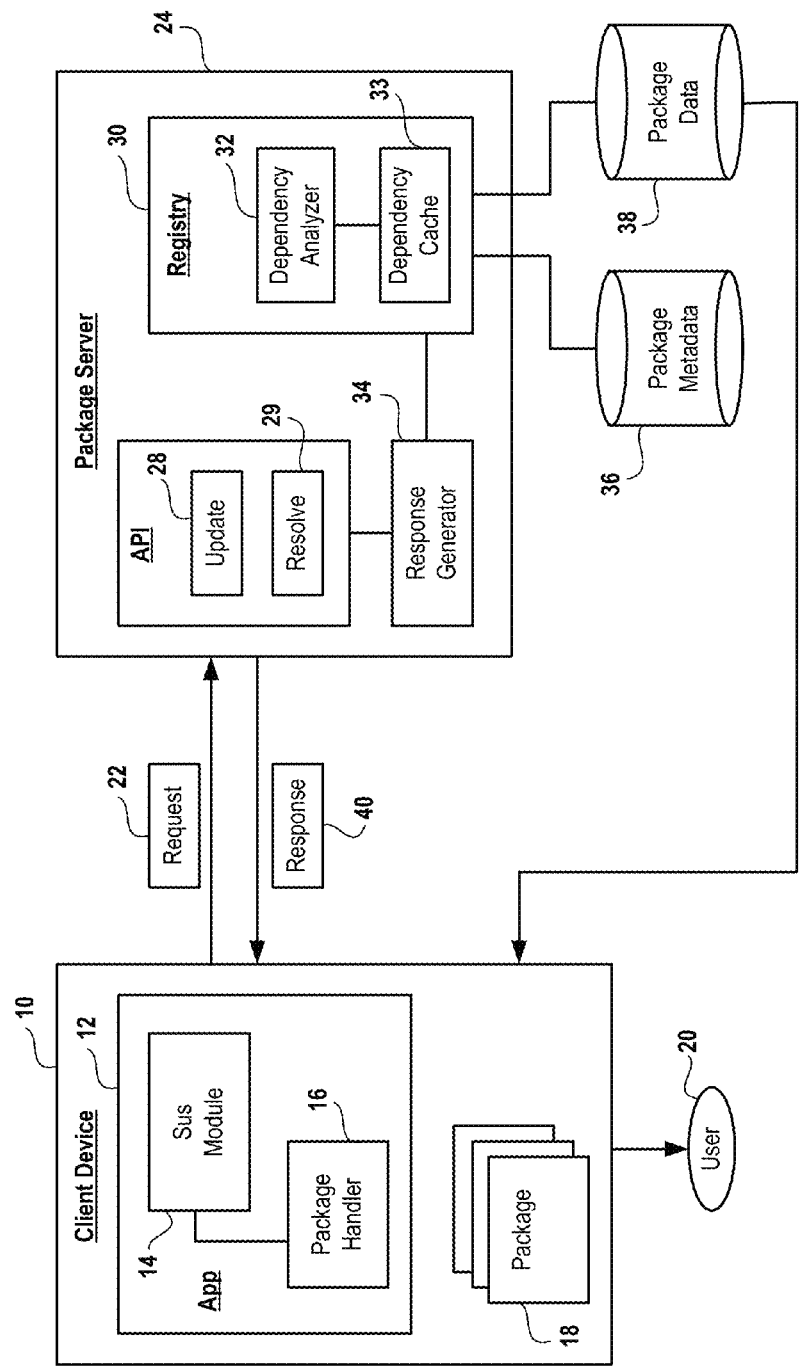
FIG. 2 illustrates a system for package management, in accordance with an embodiment of the invention.

FIG. 2 illustrates a system for package management, in accordance with an embodiment of the invention. In the illustrated system, an application 12 executes on a client device 10. In one embodiment, the application 12 is an application providing access to electronic publications. Electronic publications will be broadly understood to include electronic magazines, newspapers, newsletters, and other types of electronic publications which generally contain multiple pages of content that are part of the same document. When a user reads a regular printed publication such as an ordinary magazine, the expectation is that the entirety of the magazine is made available to the user at once. A similar expectation may exist for users of electronic publications, who would expect that once downloaded for viewing on a presentation device, the continued viewing of various pages of the electronic publication should not be dependent on network connectivity of the presentation device.

In one embodiment, the application 12 includes a subscription module 14 that manages subscription settings of the user 20, e.g. identifying publications or content feeds to which the user 20 has subscribed. In one embodiment, the subscription module 14 presents an interface by which the user may designate subscription to a given publication. The application 12 also includes a package handler 16 for managing various packages 18 which are installed on the client device 10. By way of example, in response to a command from the user to read a particular electronic publication, the package handler 16 may retrieve from the stored packages 18 the appropriate one or more packages which contain the content for the particular electronic publication which the user wishes to read. Though the packages 18 may define content for rendering on the client device 10, such as content of an electronic publication, in other embodiments, the packages 18 may also define portions of the application 12 itself, including executable portions, libraries, data files, templates, or any other portions which may be defined to support functionality of the application 12.

In one embodiment, the package handler 16 generates a request 22 that is sent to a package server 24. The request 22 may be generated in response to a user command to view or subscribe to a particular publication, by way of example. In another embodiment, the request 22 may be generated not in response to a specific user command, but as part of an update protocol executed by the application 12 to update the application's content (e.g. check for new versions of content or a publication). The request 22 accesses an application programming interface (API) 26, which in one embodiment, includes an update API 28 and a resolve API 29. Broadly speaking, a request accessing the update API 28 includes a list of currently installed packages 18 on the client device 10. The returned response 40 provides information for updating packages of the application 12 in accordance with the present state of the application. As the present state of the application may include changes in subscription status, such as adding new subscriptions or cancellation of existing subscriptions, the response may include instructions to download uninstalled packages that are needed to present content for a new or existing subscription, and may also include instructions to update existing packages or delete packages which are no longer needed.

Broadly speaking, a request accessing the resolve API 29 identifies a specific package for which information is sought. The returned response 40 identifies the location of the latest version of the specific package identified in the request. In one embodiment, the location of the specific package that is returned in response to a request accessing the resolve API is for an uncompressed version of the package. Whereas, in one embodiment, the response returned for a request accessing the update API would identify the location of a compressed version (e.g. zipped version) of the package.

In response to receiving the request 22, the response generator 34 generates an appropriate response in accordance with the API being accessed, as described. The response generator 34 generates the response based on querying a registry 30 which returns information about available packages and resolves their dependencies. The information in the registry 30 is determined based on package metadata stored in a package metadata storage 36. Broadly speaking, package metadata can include various descriptive fields, such as the name of the package, a version number, a URL for retrieving the package, names or identifiers of any other packages upon which the package is dependent, and various other fields specifying attributes about or associated with the package. A dependency analyzer 32 analyzes dependencies amongst the available packages, and this information can be delivered in real-time in response to a specific query, but may also be cached in a dependency cache 33 to enable faster servicing of future queries. Thus, in response to a query for a given package, the dependency cache 33 may first be checked to determine if its dependency tree has already been cached, and if not, then the given package's dependency tree is determined in real-time based on the package's metadata.

In response to receiving the request 22, a query made to the registry 30 based on the request returns information relevant for servicing the request, such as any packages which need to be installed or updated, any dependencies and consequent additional packages from which a required package depends that also need to be installed or updated, and packages which are no longer required on the client device and which may be deleted. Based on this information, the response generator 34 generates the response 40 which is returned to the application 12 on the client device 10. In response to receiving the response 40, the package handler 16 executes operations in accordance with the response 40, such as downloading any required packages from the package data storage 38, installing or updating packages after downloading them, and deleting existing packages which are no longer needed. As has been noted, some packages may be downloaded in a compressed form (e.g. zipped), and as such, will be uncompressed (e.g unzipped) before installation.

Figure 3A:
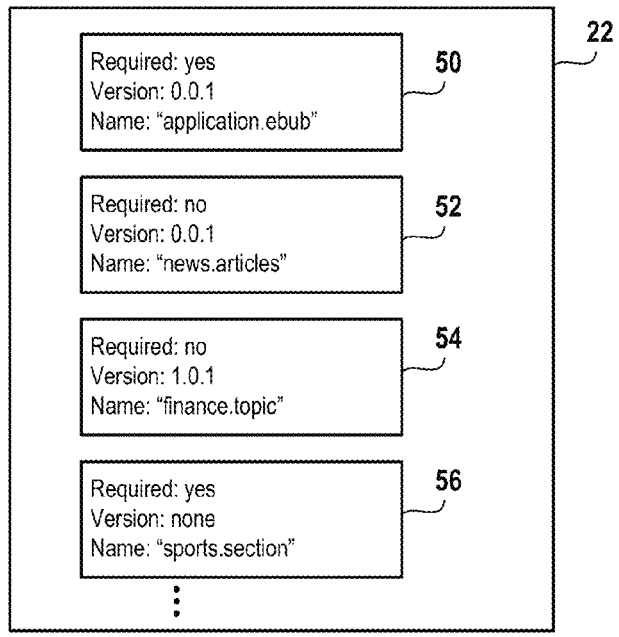
FIG. 3A illustrates an example of a request for package management, in accordance with an embodiment of the invention.

FIG. 3A illustrates an example of a request for package management, in accordance with an embodiment of the invention. The request 22 contains information about packages which are required or currently installed on the client device. By way of example, in the illustrated embodiment, the section 50 of the request indicates that the package named "application.epub" is required and that version 0.0.1 of the package is currently installed. In one embodiment, the package "application.epub" is a package for an application for accessing electronic publications. The section 52 of the request indicates that the package named "news.articles" is not required, though version 0.0.1 of this package is currently installed on the client device. Similarly, the section 54 indicates that the package named "finance.topic" is not required, yet version 1.0.1 of this package is currently installed. Section 56 of the request indicates that a package named "sports.section" is required, but no version of the package is currently installed on the client device.

Figure 3B:
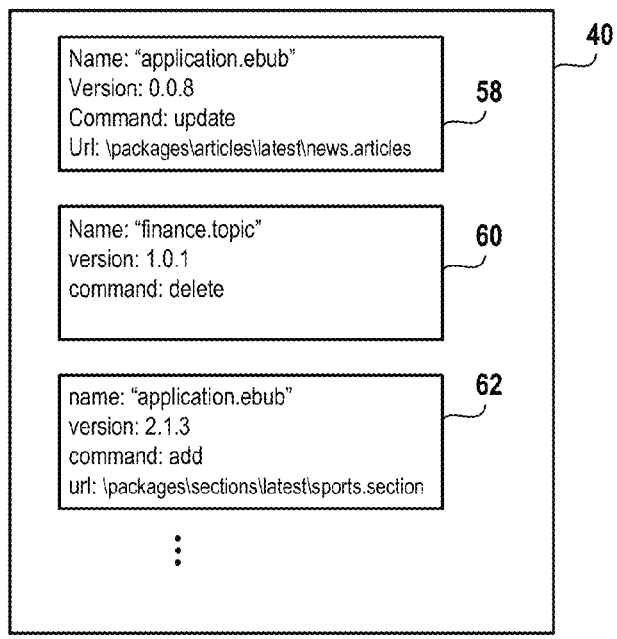
FIG. 3B illustrates an example of a response to a request for package management, in accordance with an embodiment of the invention.

FIG. 3B illustrates an example of a response to a request for package management, in accordance with an embodiment of the invention. In the illustrated embodiment, the response 40 to the request 22 shown at FIG. 3A includes various sections indicating instructions for handling existing installed packages and locations of packages to be downloaded and installed. The section 58 indicates that the "news.articles" package should be updated to version 0.0.8, and a URL for the new version is provided. The section 60 indicates that the package "finance.topic" which is currently installed on the client device should be deleted. The section 62 indicates that version 2.1.3 of the package "sports.section" should be added, and provides a URL for the package. It will be appreciated that the URL for a given package specifies its location over a network. The URL may define a world wide web address or internet location. In one embodiment, the URL defines a relative path for security purposes, e.g. wherein the URL scheme and hostname are stored with and provided by the client.

In various embodiments of the invention, the systems and methods for package management may incorporate various additional features to provide for efficiency of package management and overall improvements in user experience. For example, in one embodiment, when there are multiple instructions to be performed in response to a request, the instructions can be organized into independent transactions, with each transaction being atomically applied. Each independent group of instructions defines a transaction, which does not depend on any other transaction. Such an arrangement provides several advantages. For example, the client may choose to apply some or all transactions. Further, as the transactions are independent, failure to apply one transaction does not prevent other transactions from being applied. This can improve the user experience by enabling the user to access portions of content from packages which are successfully applied, even if content from other packages (which were not successfully applied) is missing.

As an example, in the case of an electronic publication, there may be several different packages defining various parts of the publication, such as articles, pictures, advertisements, etc. Without independent transactions, failure of a single package may prevent the user from accessing any of the electronic publication's contents. However, when update instructions are organized into independent transactions, then even if one portion of the electronic publication is not available due to failure of installation of a particular package, the other contents of the publication can still be made available to the user as the packages which define these portions can still be successfully installed and their content presented.

In one embodiment, the aforementioned response generator 34 can include an instruction grouping module which analyzes the package update instructions which are defined after querying the registry to determine and organize the instructions into independent transactions, with each instruction having exactly one transaction. Each transaction is executed atomically, so that all instructions in a transaction are performed together at substantially the same time. Failure of any single instruction within an independent transaction results in failure of the entire transaction.

The analysis for purposes of independent transactions may entail various considerations. For example, instructions which have common dependencies (e.g. a shared dependency on the same package) may be organized together in a common transaction. In other embodiments, transactions can be ordered to optimize the user experience, with prioritization schemas defined, such as prioritizing content over ads, smaller updates over larger updates, or less intrusive updates (e.g. can be applied in background) over more intrusive updates (e.g. requires application restart), by way of example. It will be appreciated that these and other considerations may be utilized in combination to determine independent transactions.

In one embodiment, a group of instructions can be atomically committed on the client device. In one embodiment, this is achieved through first downloading packages, unpacking them if needed (e.g. unzipped), and performing installation operations if necessary, into a waiting area. Then when all the changes defined by the instructions are ready to be committed, a database of records which stores a list of packages and their locations on the client device is updated atomically, thereby committing the transaction of the group of instructions in one sequence of database updates. As has been noted, the committed transaction may define additions of new packages, updates to existing packages, or deletion of existing packages. For packages which are to be deleted (which may include previously installed packages which have since been updated), the database records may be updated to identify their deleted status, while garbage collection is performed in the background to reclaim the storage space of the deleted packages.

In yet another embodiment, package metadata may include a field defining the type of network connection required of the client device before the package may be downloaded. For example, larger packages may require a faster connection (e.g. wifi or wired connection) whereas smaller packages may be downloaded over a slower connection (e.g. cellular data network). In one embodiment, the network metadata field for a given package may specify that it may be downloaded over any network connection type, or only over a certain connection type or types, such as cellular, wifi, or wired network connections. Furthermore, instructions may be organized into transactions based on network requirements of the packages. For example, instructions requiring a specific type of network connection may be grouped together into one transaction, whereas instructions that do not require any specific type of network connection may also be grouped together in a separate transaction.

In one embodiment, the response generated in response to a request may specify, for a given transaction, a dependency on another transaction. In other words, the transaction will not be performed until the other transactions on which it depends are successfully completed. This feature may be useful in situations where it is desirable to take specific actions only after others have occurred first. For example, a transaction containing instructions that delete an existing package may be specified to be dependent on successful completion of another transaction adding a new package. It may be the case that the content of the new package effectively replaces that of the existing package to be deleted. However, until the new package is actually installed, one may not wish to delete the existing package, for if the new package was not successfully installed and the existing package deleted, then the user would no longer have access to content from either of the packages. It will be appreciated that a given transaction may be configured to depend upon the completion of any number of other transactions. In one embodiment, a transaction may be defined to depend on all other transactions.

As has been described, the package management server may define various API's, such as the aforementioned update API and resolve API 29. In one embodiment, a request accessing the resolve API defines the name of specific package which is being requested. The response to the request includes the location of the package, and may also include the package name and its version number. In one embodiment, responses to requests accessing the resolve API provide the location of an uncompressed (e.g. unzipped) version of the requested package. In one embodiment, the response to a request accessing the resolve API always returns the latest version of the requested package. In one embodiment, the response to a request accessing the resolve API returns only the location of the requested package, whereas in other embodiments, the response includes the locations of any other packages from which the requested package may depend.

By contrast, requests to the update API 28 identify currently installed packages for updating. The response to a request accessing the update API may include commands to update or delete existing packages on the client device, or add new packages. In one embodiment, responses for the update API identify the location of compressed (e.g. zipped) versions of packages to be applied as updates or otherwise added.

Figure 4:
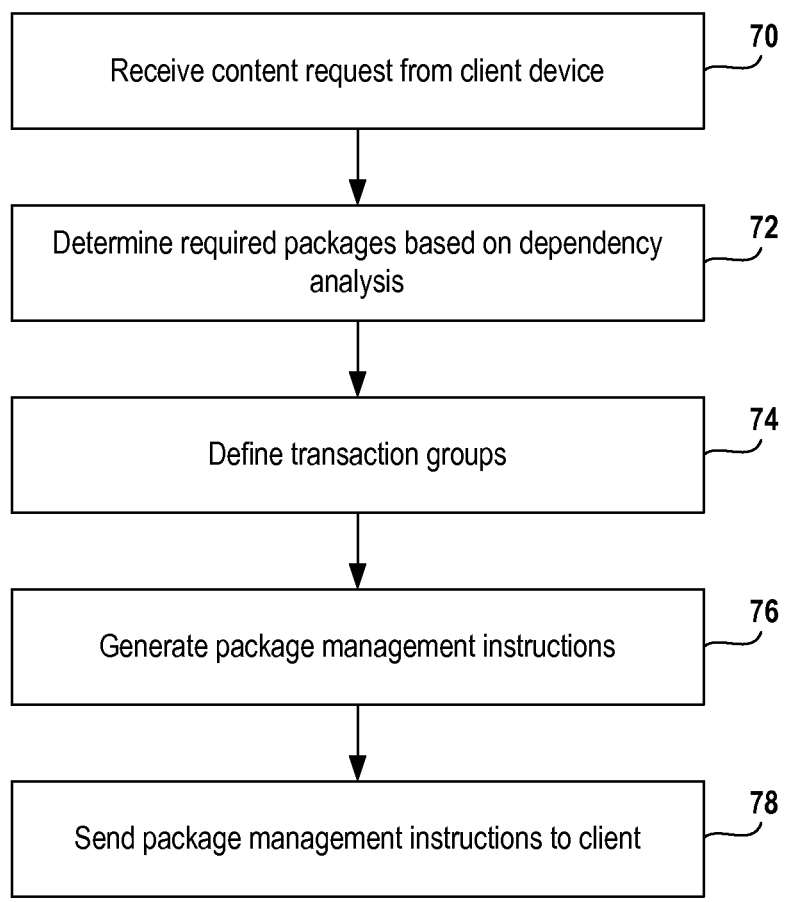
FIG. 4 illustrates a method for managing packages on a client device.

FIG. 4 illustrates a method for managing packages on a client device. At operation 70, a content request is received from a client device, the content request defining a requested content item and current package data identifying one or more currently installed packages on the client device. At operation 72, required packages are determined, based on the content request, for providing the requested content item, wherein determining the required packages includes analyzing dependencies amongst the required packages. At operation 74, one or more transactions are defined based at least in part on the analyzed dependencies amongst the required packages, each of the transactions defining a set of one or more package update instructions which are atomically committed at the client device. At operation 76, package management instructions are generated, based on the determined required packages and the current package data, for execution at the client device, the package management instructions defining actions for providing the requested content item at the client device and actions for managing the one or more currently installed packages on the client device. At operation 78, the package management instructions are sent to the client device for execution on the client device.

Figure 5:
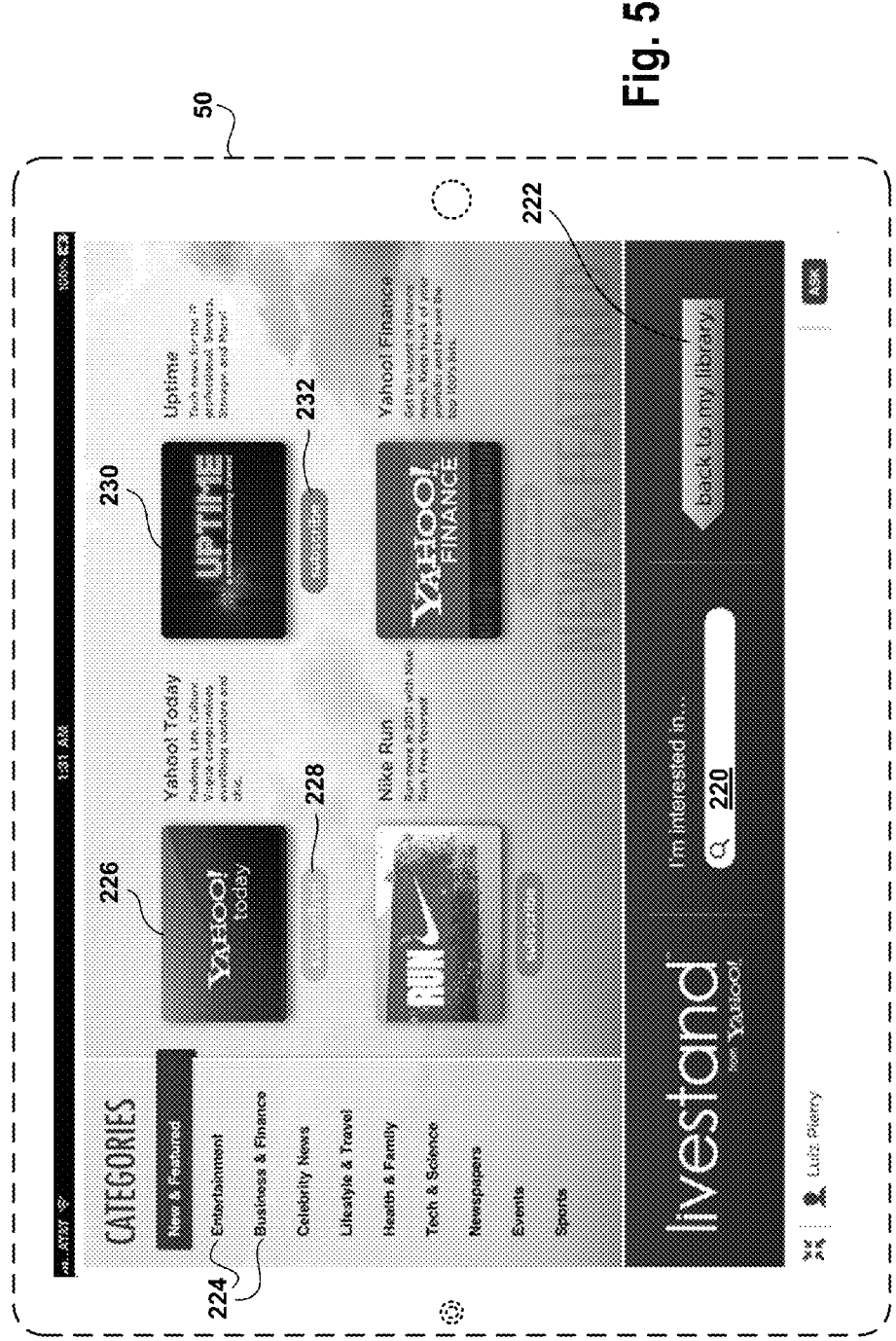
FIG. 5 illustrates a category view of an online publication stand rendered on a tablet computer, in accordance with an embodiment of the invention.

FIG. 5 illustrates a category view of an online publication stand rendered on a tablet computer 10, in accordance with an embodiment of the invention. A search box 220 is provided for enabling the user to search for electronic publications, and a library button 222 is provided to enable the user to navigate to their library of publications. Various categories 224 of electronic publications are provided for the user to select and thereby access different types of publications. In the illustrated embodiment, the "New & Featured" category has been selected, and corresponding publications from the category are shown for selection. The publication 226 is shown with a button 228 indicating that the user is already subscribed to this publication. Whereas for publication 230, the button 232 can be selected by the user in order to subscribe to the publication 230.

Figure 6:
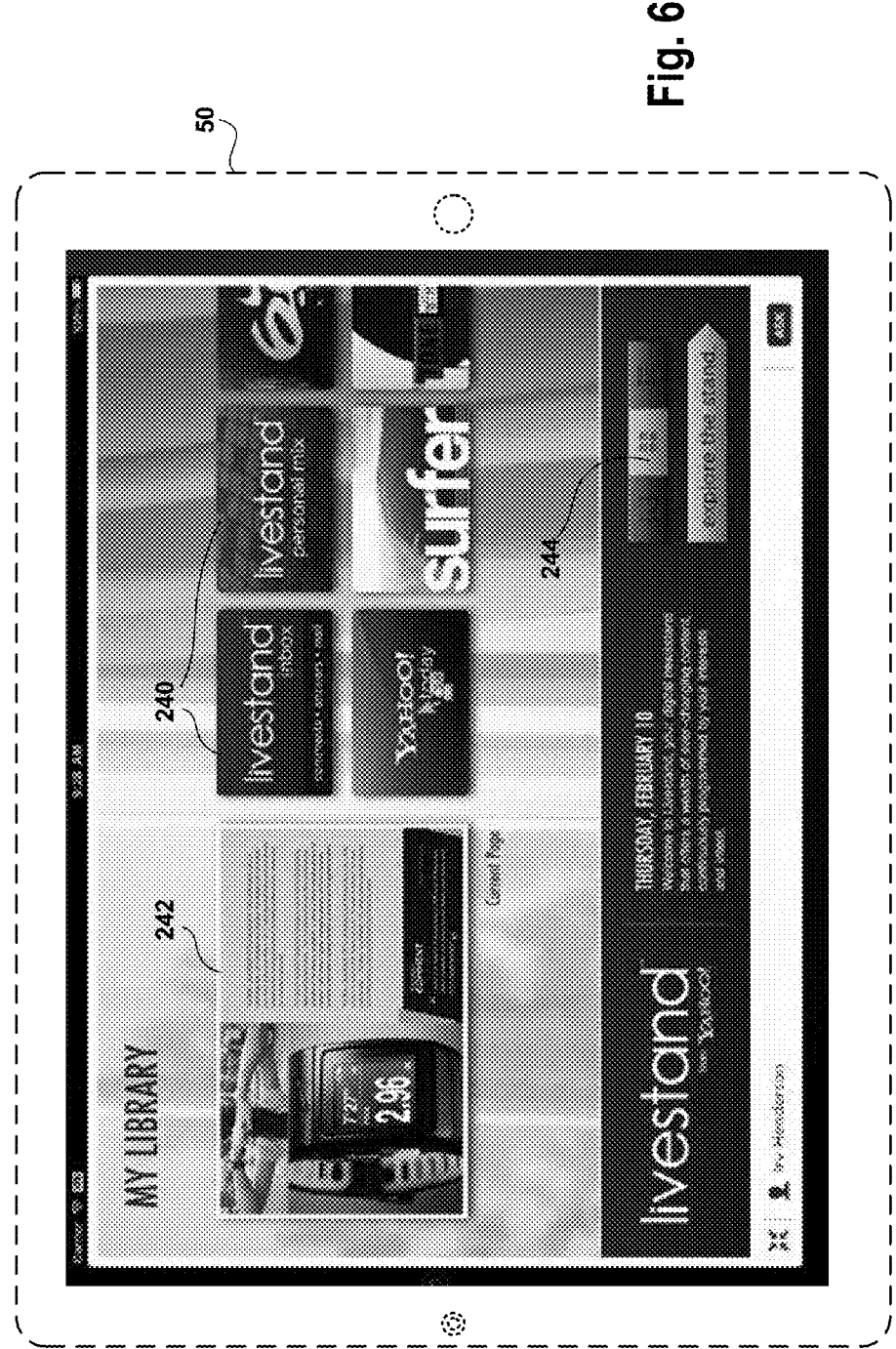
FIG. 6 illustrates a user's library view of an online publication stand, in accordance with an embodiment of the invention.

FIG. 6 illustrates a user's library view of an online publication stand, in accordance with an embodiment of the invention. The view of the user's library displays various publications 240 to which the user subscribes. Also, the view includes a current page 242 of a particular publication which the user last engaged with. A view toggle feature 244 enables the user to toggle between various levels of viewing from a single page view within a particular publication to a thumbnail view of the publications in the user's library.

Figure 7:
FIG. 7 illustrates a view of a page from an electronic publication, in accordance with an embodiment of the invention.

FIG. 7 illustrates a view of a page from an electronic publication, in accordance with an embodiment of the invention. As shown, the page includes vignettes 250 of articles included in the publication. Additionally, a display advertisement 252 is shown on the page. Several options buttons are shown at the bottom of the page. An ask button 254 provides access to help options, such as a help search function or a help menu. A comment button 256 enables the user to access and post comments relating to the electronic publication or to specific articles. A share button 258 enables the user to share the page or an article via e-mail, on a social network, etc. And a bookmark button 260 enables the user to bookmark pages within the electronic publication.

Embodiments of the invention herein described may utilize relational database systems as are known in the art. Examples of such database systems include MySQL, Oracle, and Access. Various operations as described above may be effected by performance of an operation via a relational database management system. Such database systems may be embodied in one or more server computers, which may be configured as part of a network of computers.

Figure 8:
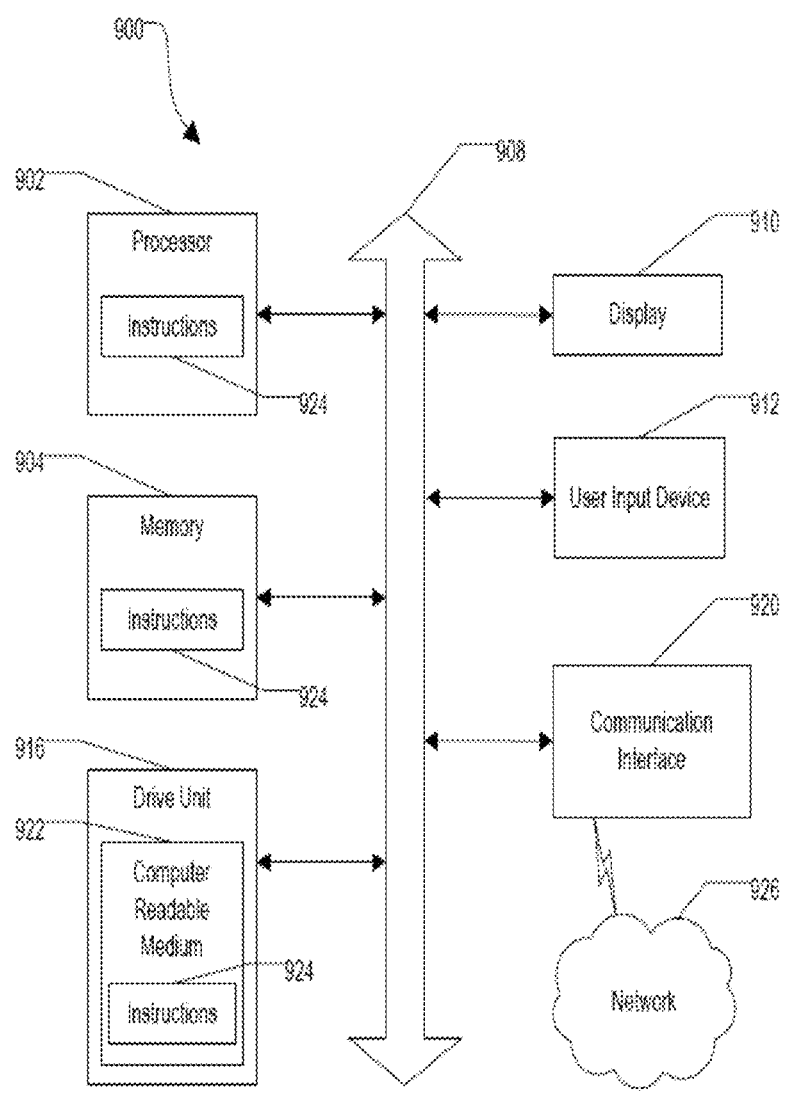
FIG. 8 illustrates an embodiment of a general computer system.

FIG. 8 illustrates an embodiment of a general computer system designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system 900 may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 8, the computer system 900 may include a processor 902, e.g., a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The computer system 900 may include a memory 904 that can communicate via a bus 908. The memory 904 may be a main memory, a static memory, or a dynamic memory. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 904 includes a cache or random access memory for the processor 902. In alternative embodiments, the memory 904 is separate from the processor 902, such as a cache memory of a processor, the system memory, or other memory. The memory 904 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 904 is operable to store instructions executable by the processor 902. The functions, acts or tasks illustrated in the figures or described herein may be performed by the programmed processor 902 executing the instructions stored in the memory 904. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 900 may further include a display unit 910, such as a liquid crystal display (LCD), an organic light emitting diode (OLED), a flat panel display, a solid state display, a cathode ray tube (CRT), a projector, a printer or other now known or later developed display device for outputting determined information. The display 910 may act as an interface for the user to see the functioning of the processor 902, or specifically as an interface with the software stored in the memory 904 or in the drive unit 916.

Additionally or alternatively, the computer system 900 may include an input device 912 configured to allow a user to interact with any of the components of system 900. The input device 912 may be a number pad, a keyboard, or a cursor control device, such as a mouse, or a joystick, touch screen display, remote control or any other device operative to interact with the computer system 900.

The computer system 900 may also or alternatively include a disk or optical drive unit 916. The disk drive unit 916 may include a computer-readable medium 922 in which one or more sets of instructions 924, e.g. software, can be embedded. Further, the instructions 924 may embody one or more of the methods or logic as described herein. The instructions 924 may reside completely or partially within the memory 904 and/or within the processor 902 during execution by the computer system 900. The memory 904 and the processor 902 also may include computer-readable media as discussed above.

In some systems, a computer-readable medium 922 includes instructions 924 or receives and executes instructions 924 responsive to a propagated signal so that a device connected to a network 926 can communicate voice, video, audio, images or any other data over the network 926. Further, the instructions 924 may be transmitted or received over the network 926 via a communication port or interface 920, and/or using a bus 908. The communication port or interface 920 may be a part of the processor 902 or may be a separate component. The communication port 920 may be created in software or may be a physical connection in hardware. The communication port 920 may be configured to connect with a network 926, external media, the display 910, or any other components in system 900, or combinations thereof. The connection with the network 926 may be a physical connection, such as a wired Ethernet connection or may be established wirelessly as discussed below. Likewise, the additional connections with other components of the system 900 may be physical connections or may be established wirelessly. The network 926 may alternatively be directly connected to the bus 908.

While the computer-readable medium 922 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The computer-readable medium 922 may be non-transitory, and may be tangible.

The computer-readable medium 922 can include a solid-state memory such as a memory card or other package that houses one or more non-volatile read-only memories. The computer-readable medium 922 can be a random access memory or other volatile re-writable memory. Additionally or alternatively, the computer-readable medium 922 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 900 may be connected to one or more networks 926. The network 926 may be the same as, similar to, and/or in communication with networks 130 and/or 135. Any of networks 130, 135, and 926 may be wired or wireless. The wireless network may be a cellular telephone network, an 802.11, 802.16, 802.20, or WiMax network. Further, the networks 130, 135, and 926 may be a public network, such as the Internet, a private network, such as an intranet, or combinations thereof, and may utilize a variety of networking protocols now available or later developed including, but not limited to TCP/IP based networking protocols. The networks 130, 135, and 926 may include wide area networks (WAN), such as the Internet, local area networks (LAN), campus area networks, metropolitan area networks, a direct connection such as through a Universal Serial Bus (USB) port, or any other networks that may allow for data communication. The networks 130, 135, and 926 may be configured to couple one computing device to another computing device to enable communication of data between the devices. The networks 130, 135, and 926 may generally be enabled to employ any form of machine-readable media for communicating information from one device to another. The networks 130, 135, and 926 may include communication methods by which information may travel between computing devices. The network 130 may include the Internet and may include all or part of network 135; network 135 may include all or part of network 130. The networks 130, 135, and 926 may be divided into sub-networks. The sub-networks may allow access to all of the other components connected to the networks 130, 135 in the system 100, or the sub-networks may restrict access between the components connected to the networks 130, 135. The networks 130, 135, and 926 may be regarded as a public or private network connection and may include, for example, a virtual private network or an encryption or other security mechanism employed over the public Internet, or the like.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A computer-implemented method for managing packages on a client device, comprising:

receiving a content request from a client device, the content request defining a requested content item and current package data identifying one or more currently installed packages on the client device;

using a response generator to query a registry based on the content request, to determine required packages for providing the requested content item, wherein determining the required packages includes using a dependency analyzer to analyze dependencies amongst the required packages;

generating, by a response generator, based on the determined required packages and the current package data, a response to the content request, the response defining package management instructions for providing the requested content item at the client device and for managing the one or more currently installed packages on the client device;

wherein generating the package management instructions includes using an instruction grouping module to identify common dependencies amongst the required packages and to organize package instructions for the required packages into one or more transactions based at least in part on the identified common dependencies amongst the required packages, and determining a priority order according to which the transactions are to be committed, each of the transactions defining a set of one or more package instructions which are to be atomically committed at the client device, wherein processing a given transaction to be atomically committed is configured so that failure of any single package instruction within the given transaction results in failure of the given transaction, wherein package instructions of any one of the transactions are not dependent on package instructions of any other transaction, wherein the priority order according to which the transactions are to be committed is defined to prioritize non-advertising content over advertising content;

sending the package management instructions to the client device.

2. The method of claim 1, wherein generating the response includes determining one or more of the required packages which are not currently installed on the client device; and wherein the actions for providing the requested content item at the client device include actions for retrieving the one or more of the required packages which are not currently installed on the client device.

3. The method of claim 1, wherein the actions for managing the one or more currently installed packages on the client device include instructions for one or more of a package update or a package deletion or a package addition.

4. The method of claim 1, wherein analyzing dependencies amongst the required packages includes accessing a predefined dependency tree for a given required package.

5. The method of claim 1, wherein the content request is defined to retrieve content for an electronic publication.

6. A non-transitory tangible computer readable medium having program instructions embodied thereon, including:

program instructions for receiving a content request from a client device, the content request defining a requested content item and current package data identifying one or more currently installed packages on the client device;

program instructions for using a response generator to query a registry based on the content request, to determine required packages for providing the requested content item, wherein determining the required packages includes using a dependency analyzer to analyze dependencies amongst the required packages;

program instructions for generating, by a response generator, based on the determined required packages and the current package data, a response to the content request, the response defining package management instructions for providing the requested content item at the client device and for managing the one or more currently installed packages on the client device;

wherein generating the package management instructions includes using an instruction grouping module to identify common dependencies amongst the required packages and to organize package instructions for the required packages into one or more transactions based at least in part on the identified common dependencies amongst the required packages, and determining a priority order according to which the transactions are to be committed, each of the transactions defining a set of one or more package instructions which are to be atomically committed at the client device, wherein processing a given transaction to be atomically committed is configured so that failure of any single package instruction within the given transaction results in failure of the given transaction, wherein package instructions of any one of the transactions are not dependent on package instructions of any other transaction, wherein the priority order according to which the transactions are to be committed is defined to prioritize non-advertising content over advertising content;

program instructions for sending the package management instructions to the client device.

7. The tangible computer readable medium of claim 6, wherein generating the response includes determining one or more of the required packages which are not currently installed on the client device; and wherein the actions for providing the requested content item at the client device include actions for retrieving the one or more of the required packages which are not currently installed on the client device.

8. The tangible computer readable medium of claim 6, wherein the actions for managing the one or more currently installed packages on the client device include one or more of a package update or a package deletion.

9. The tangible computer readable medium of claim 6, wherein analyzing dependencies amongst the required packages includes accessing a predefined dependency tree for a given required package.

10. The tangible computer readable medium of claim 6, wherein the content request is defined to retrieve content for an electronic publication.

11. A system for managing packages on a client device, comprising:

a package management server having a processor configured to receive a content request from a client device, the content request defining a requested content item and current package data identifying one or more currently installed packages on the client device;

wherein the package management server includes a registry for determining, based on the content request, required packages for providing the requested content item, the registry including a dependency analyzer for analyzing dependencies amongst the required packages;

wherein the package management server includes a response generator for generating, based on the determined required packages and the current package data, a response to the content request, the response defining package management instructions for providing the requested content item at the client device and for managing the one or more currently installed packages on the client device, the response generator configured to send the package management instructions to the client device;

wherein generating the package management instructions includes using an instruction grouping module to identify common dependencies amongst the required packages and to organize package instructions for the required packages into one or more transactions based at least in part on the identified common dependencies amongst the required packages, and determining a priority order according to which the transactions are to be committed, each of the transactions defining a set of one or more package instructions which are to be atomically committed at the client device, wherein processing a given transaction to be atomically committed is configured so that failure of any single package instruction within the given transaction results in failure of the given transaction, wherein package instructions of any one of the transactions are not dependent on package instructions of any other transaction, wherein the priority order according to which the transactions are to be committed is defined to prioritize non-advertising content over advertising content.

12. The system of claim 11, wherein the response includes one or more of the required packages which are not currently installed on the client device; and wherein the actions for providing the requested content item at the client device include actions for retrieving the one or more of the required packages which are not currently installed on the client device.

13. The system of claim 11, wherein the actions for managing the one or more currently installed packages on the client device include one or more of a package update or a package deletion.

14. The system of claim 11, wherein analyzing dependencies amongst the required packages includes accessing a predefined dependency tree for a given required package.

15. The system of claim 11, wherein the content request is defined to retrieve content for an electronic publication.

* * * * *